(12) United States Patent
Hisada

(10) Patent No.: US 7,649,588 B2
(45) Date of Patent: Jan. 19, 2010

(54) POSITIONING STRUCTURE FOR SHEET-SHAPED COMPONENT AND DISPLAY DEVICE USING SAME

(75) Inventor: Yasunari Hisada, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 154 days.

(21) Appl. No.: 11/910,132

(22) PCT Filed: Apr. 28, 2006

(86) PCT No.: PCT/JP2006/309020

§ 371 (c)(1),
(2), (4) Date: Sep. 28, 2007

(87) PCT Pub. No.: WO2006/134731

PCT Pub. Date: Dec. 21, 2006

(65) Prior Publication Data

US 2008/0273136 A1 Nov. 6, 2008

(30) Foreign Application Priority Data

Jun. 15, 2005 (JP) ............................. 2005-175221

(51) Int. Cl.
*G02F 1/1333* (2006.01)
(52) U.S. Cl. .................................... 349/58; 248/222.14
(58) Field of Classification Search ............. 248/222.14
See application file for complete search history.

(56) References Cited

FOREIGN PATENT DOCUMENTS

| JP | 2001-209327 A | 8/2001 |
|----|---------------|--------|
| JP | 3485511 B2 | 1/2004 |
| JP | 3592171 B2 | 11/2004 |

OTHER PUBLICATIONS

Official communication issued in the International Application No. PCT/JP2006/309020, mailed on Jul. 18, 2006.

*Primary Examiner*—Omar Rojas
(74) *Attorney, Agent, or Firm*—Keating & Bennett, LLP

(57) ABSTRACT

A liquid crystal panel is mounted in a frame. A positioning component for supporting the liquid crystal panel in a positioned state is attached to the frame using a screw component. A positioning protrusion is provided in the frame. A positioning hole portion into which the positioning protrusion can be inserted is provided in the positioning component. The positioning hole portion has a size such that, in a state in which the positioning protrusion is inserted therein, the positioning component can be moved in a direction in which a support surface of the positioning component approaches or moves away from the liquid crystal panel. A bracket surface that is substantially parallel with a direction in which the support surface of the positioning component approaches or moves away from liquid crystal panel is provided in the positioning protrusion.

5 Claims, 10 Drawing Sheets

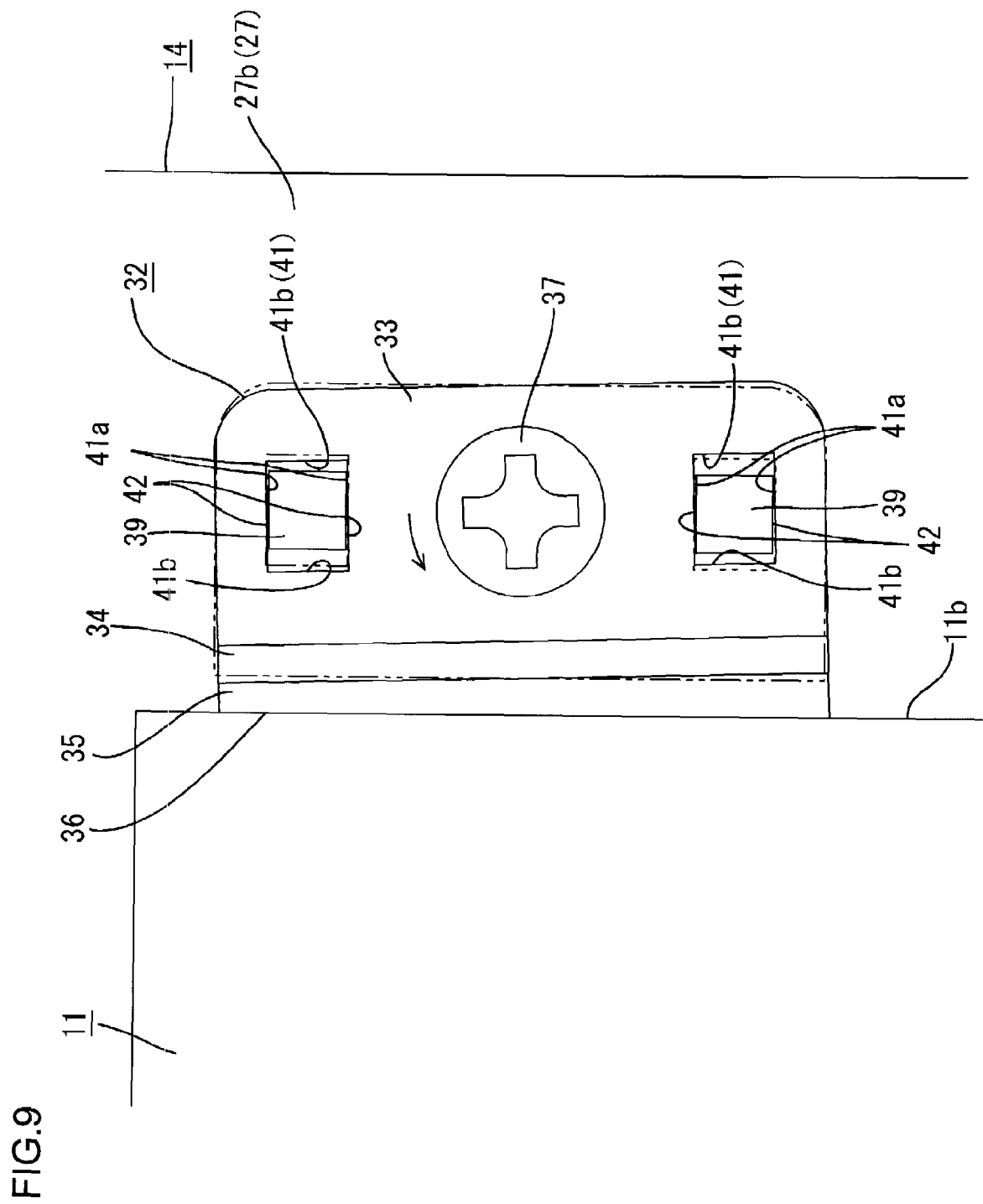

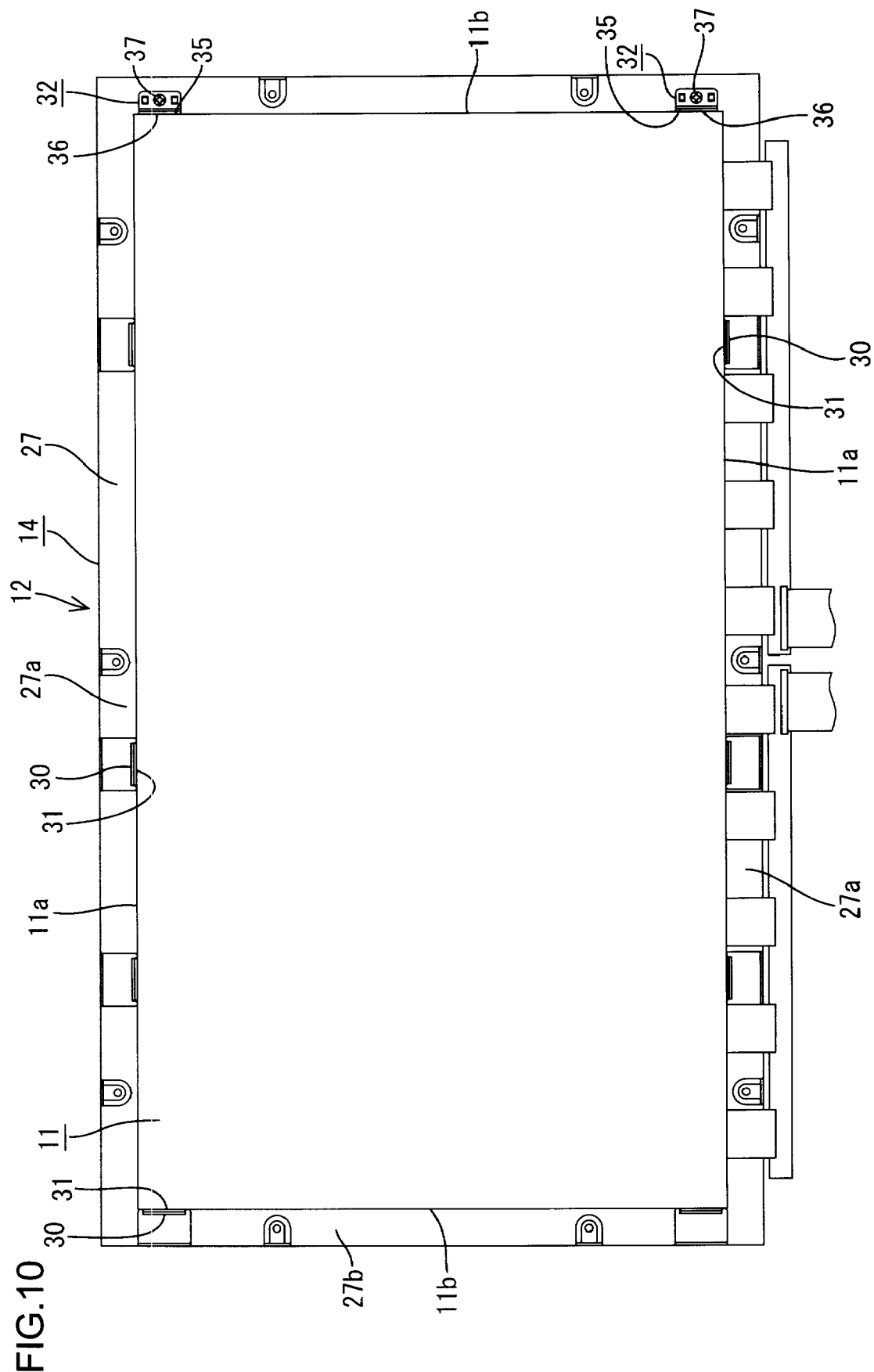

POSITIONING STRUCTURE FOR SHEET-SHAPED COMPONENT AND DISPLAY DEVICE USING SAME

BACKGROUND OF THE INVENTION

1. Field of the Invention

The present invention relates to a positioning structure for a sheet-shaped component, and a display device that includes the same.

2. Description of the Related Art

A liquid crystal display device that is one type of display device is broadly constructed by assembling a backlight device as an external light source on the rear side of a liquid crystal panel for displaying images. The liquid crystal panel is held in a state in which it is sandwiched between a frame-shaped bezel that surrounds the display region thereof and a frame that is one portion of the backlight device. When assembling the liquid crystal panel, after mounting the liquid crystal panel on the frame, the liquid crystal panel is placed into contact with the bezel from the front surface side and a screw is tightened.

In this assembly process, it is necessary to support the liquid crystal panel that is mounted on the frame in a positioned state with respect to the surface direction thereof. Consequently, positioning portions that are capable of supporting the outer peripheral end surface of the liquid crystal panel are provided in the frame. The positioning portions are disposed at locations corresponding to four sides of the outer peripheral end surface of the liquid crystal panel in the frame.

However, if all of the positioning portions are provided beforehand in the frame, a problem arises that the workability when placing the liquid crystal panel is unfavorable. Hence, a configuration could be considered in which a positioning portion corresponding to at least one side is provided as a separate member from the frame, and after mounting the liquid crystal panel by passing it through the place in the frame in which the positioning portion is not provided, a positioning component is attached as a separate member.

In this connection, the structure disclosed in Japanese Patent Laid Open No. 2001-209327 is known as an example of a structure in which a positioning component is provided as a separate member from a frame.

The following structure can be considered as a structure for fixing a positioning component when the positioning component is provided as a separate member to a frame as described above. Namely, a structure in which a through hole that allows a screw component to pass therethrough is provided in the positioning component and a screw hole for tightening the screw component is provided in the frame.

On the other hand, variations in the size of a liquid crystal panel may arise for each individual product within a range of tolerances. Hence, a structure can be considered in which a positioning protrusion is provided in the frame, while a positioning recess into which the positioning protrusion can be inserted is provided in the positioning component, and by making the positioning recess so as to have a rectangular shape, the mounting position of the positioning component can be adjusted in accordance with the size of the liquid crystal panel.

However, when the positioning recess is made to have a rectangular shape as described above, the following problem arises. That is, although the work of tightening the screw component is performed using an electric tool, since a clearance is provided to allow movement as described above between the positioning recess and the positioning protrusion, there is a concern that the positioning component will be rotated by the tightening force applied to the screw component.

SUMMARY OF THE INVENTION

In order to overcome the problems described above, preferred embodiments of the present invention control rotation of a positioning component accompanying tightening of a screw component.

A preferred embodiment of the present invention includes a bracket component on which a translucent sheet-shaped component is mounted, a positioning component that is attached to the bracket component and is capable of supporting the sheet-shaped component in a positioned state with respect to the surface direction thereof, and a screw component that is capable of fixing the positioning component by being tightened with respect to the bracket component, wherein a positioning protrusion is provided in one of the bracket component and the positioning component, while a positioning recess into which the positioning protrusion can be inserted is provided in the other of the bracket component and the positioning component, the positioning recess having a size such that, in a state in which the positioning protrusion is inserted into the positioning recess, the positioning component can be moved in a direction in which a support surface of the positioning component approaches or moves away from the sheet-shaped component, and wherein, a bracket surface is arranged on a peripheral surface of the positioning protrusion facing the positioning recess, the bracket surface being substantially parallel with the direction in which the support surface of the positioning component approaches or moves away from the sheet-shaped component.

By adopting this configuration, when the positioning component is attached after mounting the sheet-shaped component on the bracket component, in a state in which the positioning protrusion is inserted in the positioning recess, the attachment position of the positioning component with respect to the bracket component can be adjusted by moving the positioning component in a direction in which the support surface approaches or moves away from the sheet-shaped component. Thereafter, by tightening the screw component, the sheet-shaped component is supported in a positioned state by the positioning component.

Since the positioning recess has a size that allows movement of the positioning component in a state in which the positioning protrusion is inserted therein, there is a concern that the positioning component will rotate with respect to the bracket component accompanying tightening of the screw component. However, according to preferred embodiments of the present invention, because a bracket surface that is substantially parallel with a direction in which the support surface of the positioning component approaches or moves away from the sheet-shaped component is provided on a peripheral surface facing the positioning recess of the positioning protrusion, the angular range in which the positioning component rotates accompanying tightening of the screw component can be restricted to an extremely small range.

The following configurations are preferred embodiments of the present invention.

One configuration includes a pair of the bracket surfaces that are provided on a peripheral surface facing the positioning recess of the positioning protrusion. It is thereby possible to securely receive the tightening force of the screw component with the pair of bracket surfaces.

Another configuration includes the positioning protrusion and the positioning recess provided in respective pairs at positions that sandwich the screw component. It is thereby possible to securely receive the tightening force of the screw component with the pair of positioning protrusions and the pair of positioning recesses that are provided at positions sandwiching the screw component.

A further configuration includes the positioning protrusion having a substantially square shape. Production is thereby made simple in comparison to a case in which, for example, the positioning protrusion is formed in a shape such as a trapezoidal shape.

Another configuration uses a positioning structure for the sheet-shaped component in a display device.

According to the preferred embodiments of the present invention, rotation of a positioning component accompanying tightening of a screw component can be controlled.

Other features, elements, steps, characteristics and advantages of the present invention will be described below with reference to preferred embodiments thereof and the attached drawings.

BRIEF DESCRIPTION OF THE DRAWINGS

FIG. 9 is a plan view showing a state in which a screw component is tightened.

FIG. 10 is a plan view showing a state in which the liquid crystal panel is supported in a positioned state by the positioning portion and the positioning component.

DETAILED DESCRIPTION OF PREFERRED EMBODIMENTS

Preferred embodiments of the present invention will now be described referring to FIG. 1 to FIG. 10. According to the preferred embodiments, a liquid crystal display device 10 is described as one example of a display device.

Figure 1:
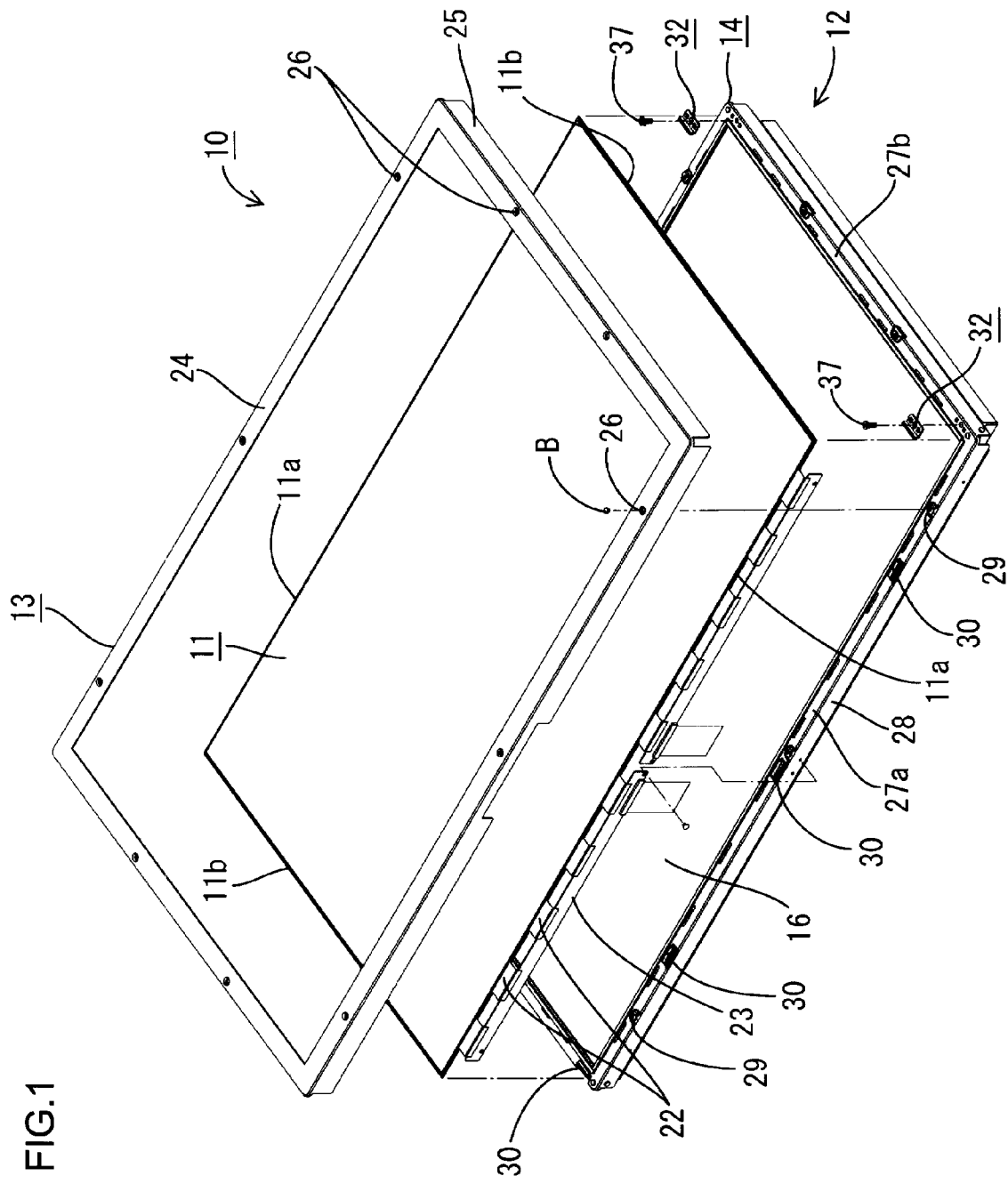
FIG. 1 is an exploded perspective view of a liquid crystal display device according to a preferred embodiment of the present invention.

As shown in FIG. 1, the liquid crystal display device 10 preferably includes a sheet-shaped liquid crystal panel 11 that is translucent, a backlight device 12 as an external light source that is disposed on the rear side thereof, and a substantially frame-shaped bezel 13 for holding the liquid crystal panel 11. The liquid crystal panel 11 is configured to be received by a frame 14 that forms the backlight device 12 and to be held in a state in which it is sandwiched between the frame 14 and the bezel 13 that is fixed to the frame 14 from the front surface.

Figure 2:
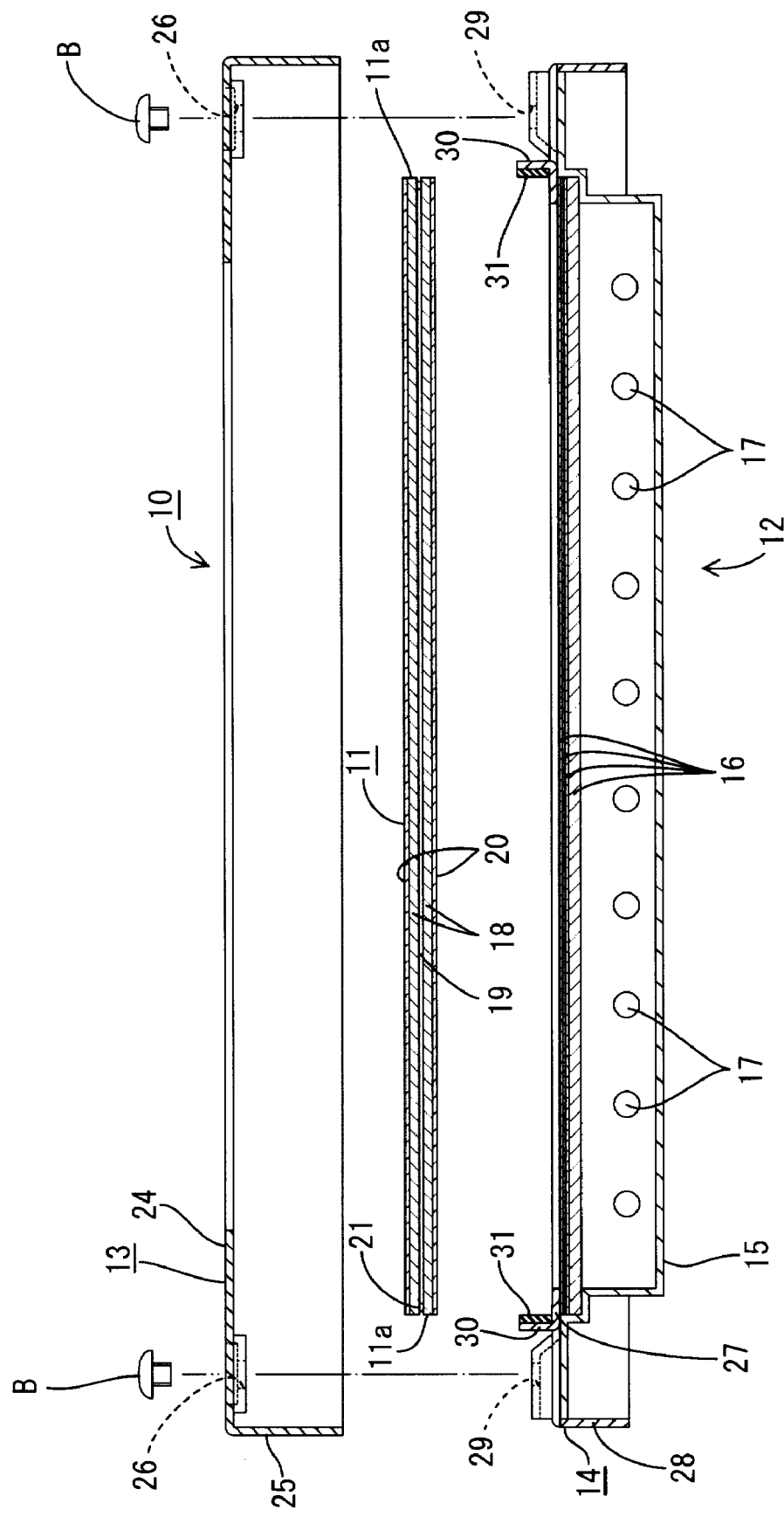
FIG. 2 is an exploded sectional view of the liquid crystal display device.

The backlight device 12 will now be described in detail. As shown in FIG. 2, the backlight device 12 preferably includes a metallic base 15 that defines a substantially rectangular box shape in which the top surface side as illustrated in the drawing is open, a plurality of optical sheets 16 (for example, four sheets including, in order from the bottom side in FIG. 2, a diffusing plate, a diffusing sheet, a lens sheet, and a brightness enhancing sheet) that are attached so as to cover the open portion of the base 15, the frame 14 that can hold the optical sheets 16 in a state in which they are sandwiched between the frame 14 and the base 15, and a plurality of cold cathode tubes 17 as lamps that are housed inside the base 15. Each optical sheet 16 is a component for converting a substantially linear shaped light that is emitted from each cold cathode tube 17 into a sheet shape, and preferably is formed to have a substantially rectangular sheet shape that is larger than the display region of the liquid crystal display device 10. The optical sheets 16 are configured so as to be stacked vertically as shown in FIG. 2 and held in a state in which an outer peripheral margin portion that is outside the display region is sandwiched between an outer peripheral margin portion of the base 15 on the rear side and the frame-shaped frame 14 on the front surface side.

The liquid crystal panel 11 preferably includes a pair of glass substrates 18, liquid crystal 19 that is filled between the two glass substrates 18, and a pair of polarizing plates 20 that are affixed to the outer surfaces (surfaces on opposite sides to the liquid crystal 19 side) of the two glass substrates 18. The two glass substrates 18 are pasted together in a state in which they face each other with a predetermined gap formed between them by a spacer. The liquid crystal 19 that is filled between the glass substrates 18 is surrounded by a sealing compound 21. In the glass substrate 18 on the rear side, switching elements (for example, TFTs) that are connected to a source wiring and a gate wiring that are substantially perpendicular to each other are arranged in a state in which pixel electrodes of R, G, and B define a matrix configuration, respectively, on the glass substrate 18 on the front side. At an end of the glass substrate 18 on the rear side, one end side of a SOF 22 (system on film) is connected through an anisotropic conductive film (ACF) to the source wiring or the gate wiring, and a print substrate 23 is connected to the other end side of the SOF 22. The print substrate 23 is fixed by a screw to a peripheral wall portion 28 of the frame 14 in a vertical posture in a manner causing the SOF 22 to bend.

To display an image on the liquid crystal panel 11 having the above described configuration, it is necessary to cause each cold cathode tube 17 of the backlight device 12 to transmit light, and also to drive each switching element by appropriately supplying signals to each wiring to thereby control the display state of the liquid crystal 19. It is thereby possible to display a desired image on the liquid crystal panel 11. Accordingly, the display region of the liquid crystal display device 10 is substantially equal to a region in which the switching elements or pixel electrodes are provided, and is a region that is located further on the inner side from the inner peripheral end surface of the bezel 13 or the frame 14. The outer peripheral margin portion of the liquid crystal panel 11, that is, a frame-shaped region that is located further on the outer side than the display region is a section that is required for fixing the liquid crystal panel 11 to the bezel 13 and the frame 14.

The bezel 13 will now be described. As shown in FIG. 1, the overall structure of the bezel 13 preferably has a substantially rectangular frame shape, which is preferably formed by subjecting a metal plate to press molding or the like. The bezel 13 includes a holding portion 24 that is placed into contact with the front surface side of the liquid crystal panel 11, and a peripheral wall portion 25 that projects in the downward direction as shown in FIG. 1 from the outer peripheral end of the holding portion 24 and is disposed on the outer side of the peripheral wall portion 28 of the frame 14. The cross section of the bezel 13 preferably is substantially L-shaped. Through holes 26 through which screws B for fixing the bezel 13 to the frame 14 can pass are provided in the holding portion 24. The through holes 26 are preferably provided at, for example, three places on each of the long side sections of the holding portion 24 and preferably at two places on each of the short side sections thereof.

Next, the frame 14 including the backlight device 12 is described in detail. Similarly to the bezel 13, the overall structure of the frame 14 preferably has a substantially rectangular frame shape, which is preferably formed by subjecting a metal plate to press molding or the like. The frame 14 includes a bracket portion 27 that receives the liquid crystal panel 11, and the peripheral wall portion 28 that projects in the downward direction as shown in FIG. 1 from the outer peripheral end of the bracket portion 27 and surrounds the outside of the peripheral wall portion of the base 15. While the bracket portion 27 is preferably arranged substantially parallel to the surface direction of the liquid crystal panel 11, the peripheral wall portion 28 is substantially perpendicular to the surface direction of the liquid crystal panel 11. Screw holes 29 into which screws B for fixing the bezel 13 as described later can be screwed are provided in the bracket portion 27. The screw holes 29 are preferably provided at, for example, three places on each of the long side sections 27a of the bracket portion 27 and preferably at two places, for example, on each of the short side sections 27b thereof.

Figure 5:
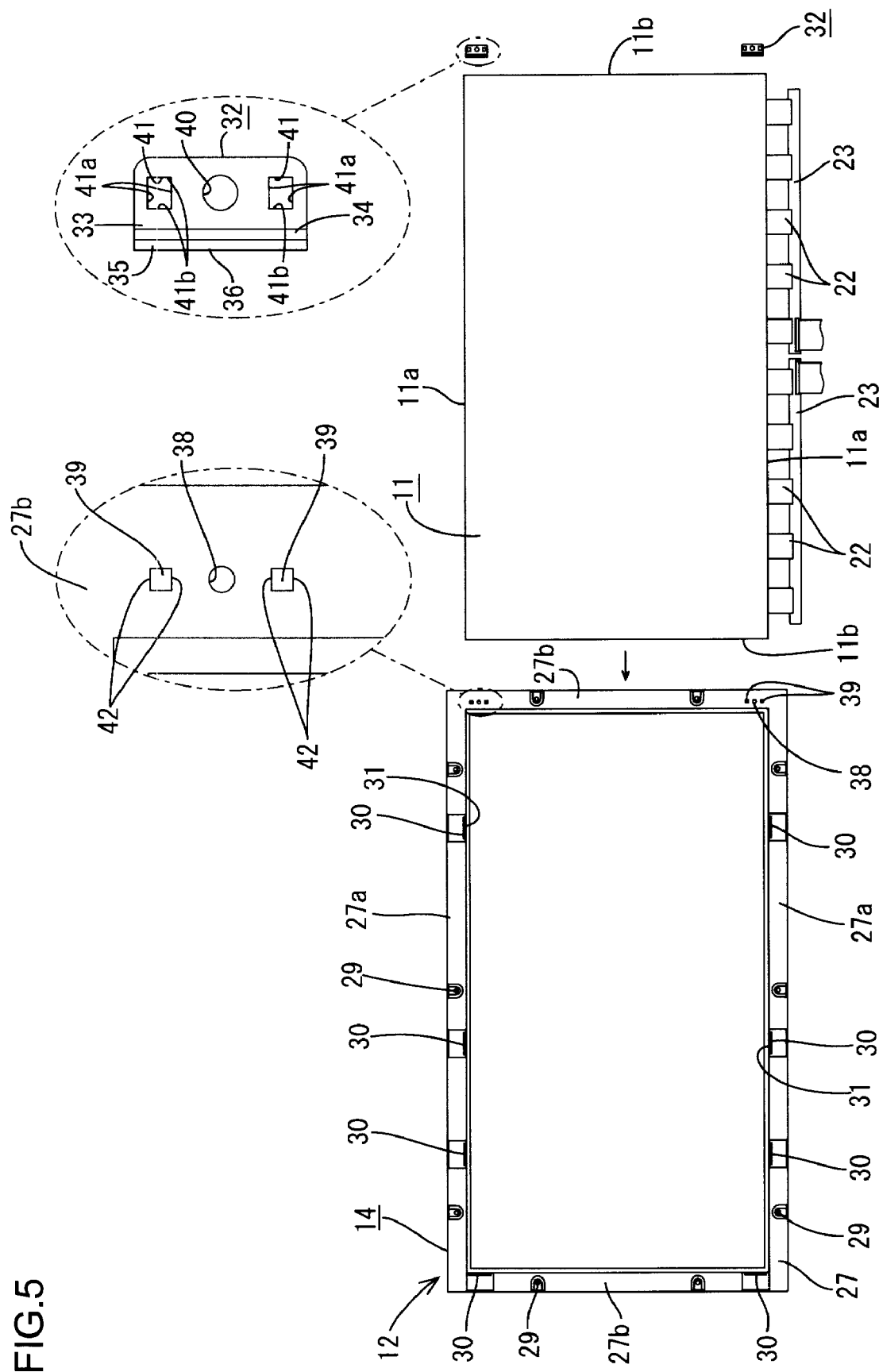
FIG. 5 is a plan view showing a state before mounting a liquid crystal panel in a frame.

As shown in FIG. 1, FIG. 2, and FIG. 5, in the bracket portion 27 of the frame 14 are provided positioning portions 30 that can position the liquid crystal panel 11 in the surface direction by supporting the outer peripheral end surfaces 11a and 11b of the mounted liquid crystal panel 11. The positioning portions 30 are formed by cutting inward into one portion of the bracket portion 27. The positioning portions 30 are arranged to protrude toward the liquid crystal panel 11 from the bracket surface with respect to the liquid crystal panel 11 of the bracket portion 27 and also face the outer peripheral end surfaces 11a and 11b of the liquid crystal panel 11. An angle formed by the positioning portions 30 with respect to the bracket portion 27 is substantially 90 degrees.

The positioning portions 30 are provided on the two long side sections 27a of the bracket portion 27 of the frame 14 and on the short side section 27b on the left side of the bracket portion 27 as shown in FIG. 5. The positioning portions 30 can support three sides among the outer peripheral end surfaces 11a and 11b of the corresponding liquid crystal panel 11, namely, the surfaces 11a on the two long sides and the surface 11b on the short side in FIG. 5. More specifically, a total of eight positioning portions 30 are preferably providing including, for example, three at locations with a predetermined clearance therebetween on each of the two long side sections 27a of the bracket portion 27, and two adjacent to the two end positions of the short side section 27b of the left side in FIG. 5. Each of the positioning portions 30 on the two long side portions 27a is arranged so as not to interact with the SOFs 22 of the liquid crystal panel 11 at the time of attachment. Buffer members 31 made of rubber or any other suitable elastic material are provided on the inner surface of each positioning portion 30, i.e., on the surface facing the outer peripheral end surfaces 11a and 11b of the liquid crystal panel 11. Since the liquid crystal panel 11 is supported by the positioning portions 30 via the elastically contractible buffer members 31, it is difficult for the liquid crystal panel 11 to be damaged by shocks or the like.

Thus, a positioning portion 30 is not provided on the short side section 27b on the right side shown in FIG. 5 of the bracket portion 27 of the frame 14. Accordingly, mounting the liquid crystal panel 11 in the frame 14 can be performed by sliding the liquid crystal panel 11 from the short side section 27b side on the right side of the bracket portion 27 of the frame 14 as shown in FIG. 5. The direction for attaching the liquid crystal panel 11 matches the longitudinal direction of the liquid crystal display device 10.

Positioning components 32 that are capable of supporting the surface 11b on the right short side shown in FIG. 5 among the outer peripheral end surfaces 11a and 11b of the liquid crystal panel 11 are attachable on the short side section 27b on the right side of the bracket portion 27. Similarly to the frame 14, the positioning component 32 is formed by subjecting a metal plate to press molding or the like so that a cross section of its overall configuration substantially forms an L-shape. The positioning components 32 are configured to be attached in a pair near the two ends of the short side section 27b on the right side of the bracket portion 27. The positions of the pair of positioning components 32 are substantially the same as the two positioning portions 30 on the short side section 27b on the left side. As described in detail later, the positioning components 32 are configured to be fixed in a mounted state with respect to the frame 14 by screw components 37.

The positioning component 32 includes a main body portion 33 that is placed into contact with the bracket portion 27 and a support portion 34 that rises from the end edge of the main body portion 33 and is capable of supporting the outer peripheral end surface 11b of the liquid crystal panel 11. The main body portion 33 is substantially parallel with the bracket portion 27 (surface direction of the liquid crystal panel 11), and the support portion 34 is substantially parallel with the positioning portion 30. The main body portion 33 and the support portion 34 both preferably have the shape of a vertical rectangle along the length direction (a direction that is substantially perpendicular with the mounting direction of the liquid crystal panel 11) of the short side sections 27b of the bracket portion 27. An angle formed by the main body portion 33 and the support portion 34 is substantially 90 degrees.

On the surface on the opposite side to the main body portion 33 side of the support portion 34, i.e., the surface facing the outer peripheral end surface 11b of the liquid crystal panel 11, an elastically contractible buffer member 35 made of, for example, rubber is provided similarly to the positioning portion 30. The surface on the opposite side to the support portion 34 side of the buffer member 35 is used as a support surface 36 with respect to the outer peripheral end surface of the liquid crystal panel.

Next, the mounting structure of the positioning component 32 with respect to the bracket portion 27 of the frame 14 is described in detail. The frame 14 is described first. A screw hole 38 into which a screw component 37 for fixing the positioning component 32 can be screwed is provided in the short side section 27b on the right side as shown in FIG. 5 of the bracket portion 27 of the frame 14. Two screw holes 38 are arranged at positions corresponding to the mounting positions of the positioning components 32 (near both end positions in the short side section 27b). The positioning protrusions 39 are provided in respective pairs at positions on the short side section 27b that sandwich the above described screw hole 38. The two positioning protrusion 39 and the screw hole 38 are disposed in an aligned manner along the length direction of the bracket portion 27 or the positioning component 32, and the center positions of each are arranged substantially collinear. The shape and the like of the positioning protrusions 39 are described in detail later.

A screw through-hole 40 through which a screw component 37 can pass is penetratingly formed at a center position in the length direction in the main body portion 33 of each positioning component 32. The screw through hole 40 preferably has a substantially circular shape in which the diametrical dimensions are larger than the shank of the screw component 37 by a predetermined clearance amount. A pair of positioning hole portions 41 into which the positioning protrusions 39 on the frame 14 can be inserted are provided at positions sandwiching the screw through hole 40 in the main body portion 33. The positioning hole portions 41 are disposed near positions at both ends of the main body portion 33 penetrate through the main body portion 33. The two positioning hole portions 41 and the screw through hole 40 are arranged in an aligned manner along the length direction of the bracket portion 27 or the positioning component 32, and the center positions of each are arranged substantially collinear with each other.

The positioning hole portion 41 preferably has a substantially rectangular shape elongated along the lateral direction, i.e., the longitudinal direction of the liquid crystal display device 10 (direction in which the support surface 36 of the positioning component 32 approaches or moves away from the liquid crystal panel 11). Among the inner peripheral surfaces of the positioning hole portion 41, a surface 41a on the side of a long side (surface 41a facing a bracket surface 42 described later) is substantially straight along the lateral direction, and a surface 41b on the side of a short side is formed substantially straight along the vertical direction.

The dimensions in the vertical direction of the positioning hole portion 41 define a size that has a minimum clearance of a degree that allows insertion of the positioning protrusion 39, while the dimensions in the lateral direction define a size with a predetermined clearance that are larger than the dimensions in the vertical direction. Accordingly, in a state in which the positioning protrusion 39 is inserted into the positioning hole portion 41, it is possible to relatively move the positioning component 32 with respect to the frame 14, and accompanying this movement the support surface 36 of the positioning component 32 approaches or moves away from the outer peripheral end surface 11b of the liquid crystal panel 11. A difference (clearance) between the dimensions in the lateral direction of the positioning protrusion 39 and the dimensions in the lateral direction of the positioning hole portion 41 are substantially the same as, or greater than, the tolerance range in the length dimension of the long side when manufacturing the liquid crystal panel 11.

A clearance between the screw through hole 40 and the screw hole 38 (where the shank of screw component 37 is inserted) is about the same as the clearance in the lateral direction between the positioning protrusion 39 and the positioning hole portion 41 as described above. As a result, no matter what position the positioning component 32 is installed at, the screw through hole 40 definitely communicates with the screw hole 38.

The positioning protrusion 39 will now be described in detail. The positioning protrusion 39 is made to protrude further to the side of the positioning component 32 than the abutting surface with respect to the positioning component 32 of the bracket portion 27 by knocking out the bracket portion 27 from the rear side. As shown in FIG. 5, the cross sectional shape of the positioning protrusion 39 defines a substantially square shape, and more specifically, defines a substantially square shape in which the dimensions in the vertical direction and the dimensions in the lateral direction are substantially the same. Among the outer peripheral surfaces (peripheral surfaces facing the positioning hole portion 41) of the positioning protrusion 39, the surface on the upper side and the surface on the lower side shown in FIG. 5, i.e., the surfaces along the lateral direction, are taken as bracket surfaces 42 with respect to the positioning hole portion 41.

Figure 8:
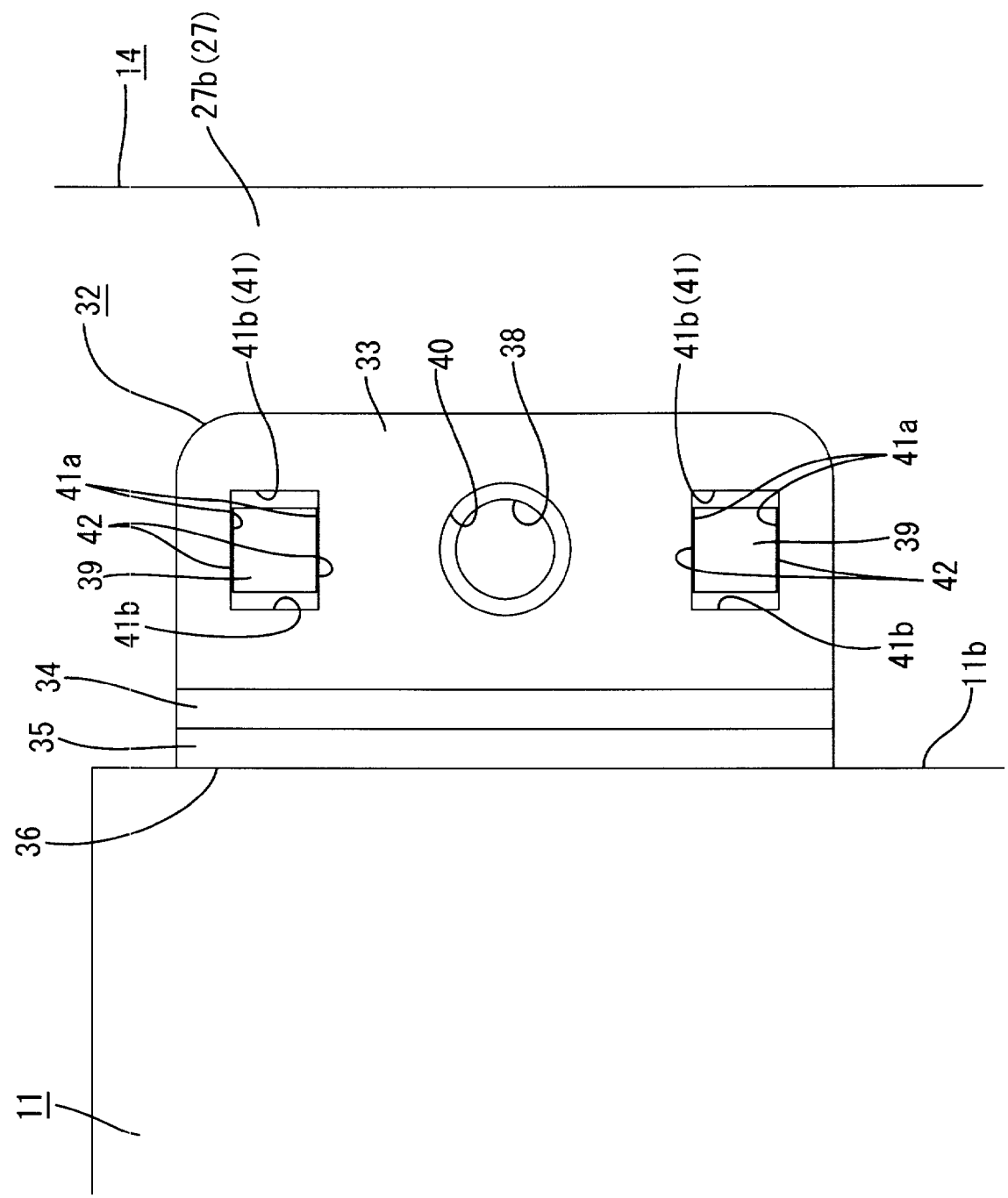
FIG. 8 is a plan view showing a state in which the positioning component has been moved to the liquid crystal panel side so that the support surface contacts therewith.

More specifically, the bracket surfaces 42 are provided in respective pairs on each positioning protrusion 39, and face each other. The bracket surfaces 42 can regulate the rotational movement of the positioning component 32 by contacting the surfaces 41a of the positioning hole portion 41 when the positioning component 32 attempts to rotate due to a tightening force generated when tightening the screw component 37. The bracket surfaces 42 preferably have a shape that is substantially straight along the lateral direction and is substantially parallel with the surfaces 41a of the positioning hole portion 41. In other words, the bracket surfaces 42 are substantially parallel with a direction in which the support surface 36 of the positioning component 32 approaches or moves away from the liquid crystal panel 11. Accordingly, in a state in which the positioning protrusion 39 is inserted inside the positioning hole portion 41, a distance between the surfaces 41a of the positioning hole portion 41 and the bracket surfaces 42 is substantially uniform across the full length thereof (FIG. 8).

The present preferred embodiment has the above described structure. The operation of the present preferred embodiment will now be described. After separately manufacturing the bezel 13, the liquid crystal panel 11, and the backlight device 12, work is performed to assemble these components. First, work is performed to mount the liquid crystal panel 11 on the frame 14 of the backlight device 12 from the state shown in FIG. 5. The liquid crystal panel 11 is inserted by sliding the liquid crystal panel 11 into the bracket portion 27 of the frame 14 from the right side as shown in FIG. 5 (the side on which the positioning component 32 is attached later). At this time, the print substrate 23 is supported in an appropriate position so that the SOFs 22 do not interact with the positioning portions 30.

Figure 6:
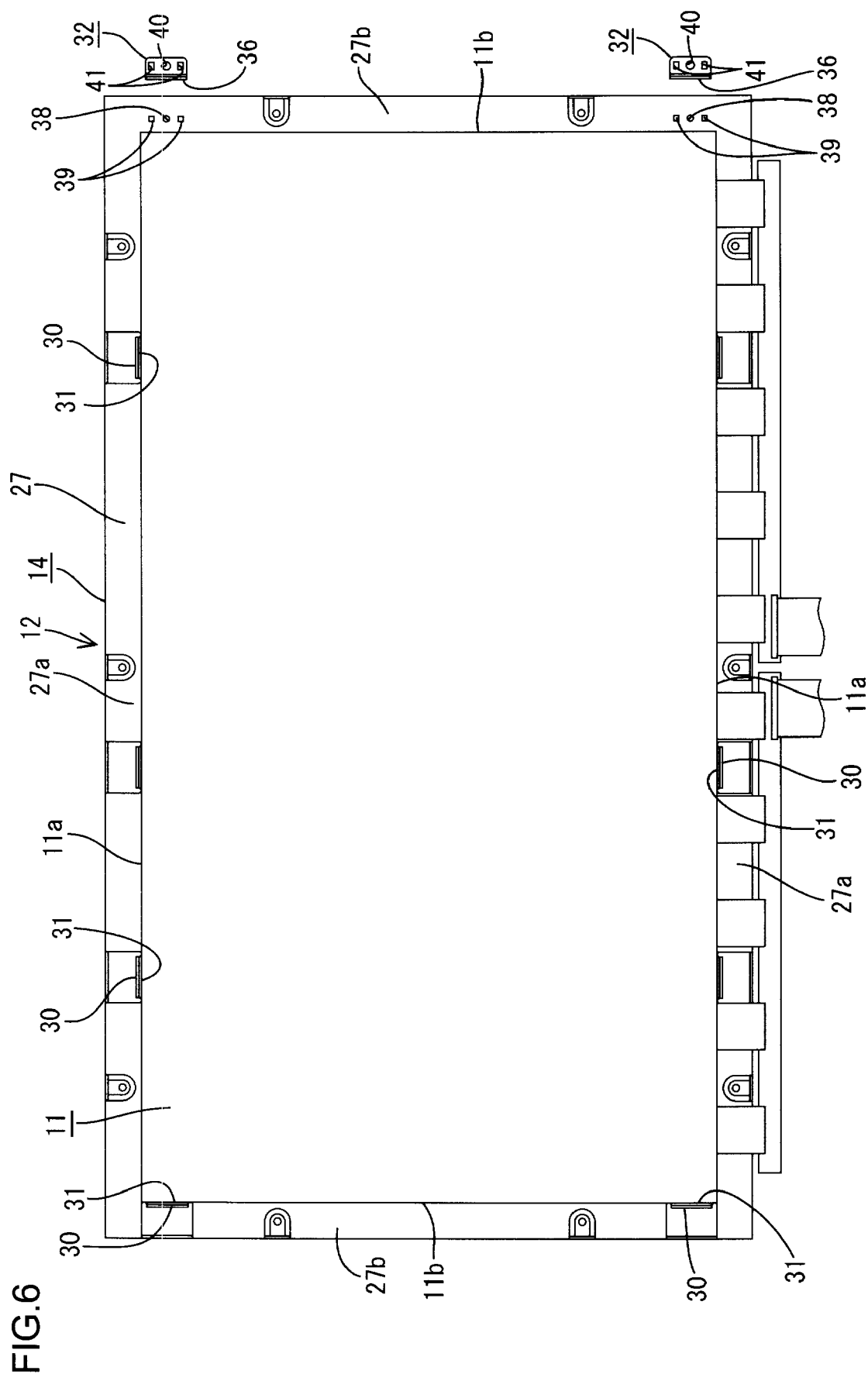
FIG. 6 is a plan view showing a state in which the liquid crystal panel is mounted in the frame.

As shown in FIG. 6, the liquid crystal panel 11 is pushed in as far as a depth at which the surface 11b on the interior side in the installation direction (surface 11b on the short side shown on the left in the figure) contacts against the buffer members 31 of the positioning portions 30. In this state, because the buffer members 31 of the positioning portions 30 contact against three sides of the outer peripheral end surfaces 11a and 11b of the liquid crystal panel 11, the liquid crystal panel 11 is supported in a positioned state from three directions. Even in a case in which the length dimensions of the short side of the liquid crystal panel 11 vary for each product, since the buffer members 31 of the positioning portions 30 that are disposed on the two long side sections 27a of the bracket portions 27 can elastically contract, those variations can be absorbed.

Figure 7:
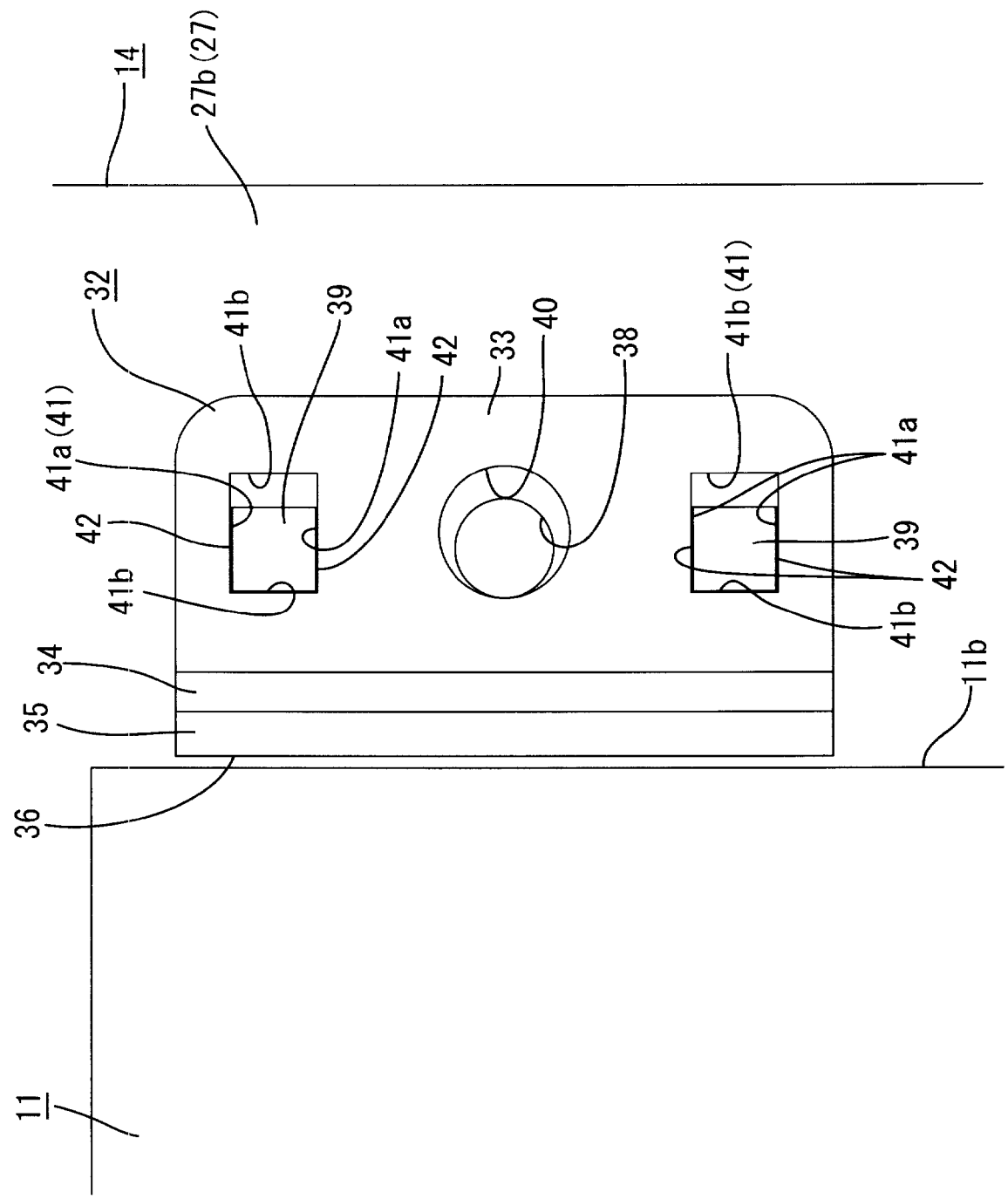
FIG. 7 is a plan view showing a state in which a positioning component is mounted in the frame.

Subsequently, work to attach the positioning component 32 to the frame 14 is performed. The main body portion 33 of the positioning component 32 is mounted on the bracket portion 27 while aligning the two positioning hole portions 41 with the two positioning protrusions 39. At this time, as shown in FIG. 7, to achieve a state in which the support surface 36 is moved away from the opposing surface 11b of the liquid crystal panel 11 (surface 11b of the short side that is shown on the right in the figure), the positioning protrusion 39 is inserted at a position near the left side of the positioning hole portion 41 as shown in the figure. Thereafter, the positioning component 32 is moved toward the left side in the figure along the lateral direction, i.e., to the side approaching the liquid crystal panel 11. This movement is allowed by the clearance between the positioning protrusion 39 and the positioning hole portion 41.

Next, as shown in FIG. 8, the positioning component 32 is moved until the support surface 36 of the buffer member 35 contacts against the opposing surface 11b of the liquid crystal panel 11 and the buffer member 35 elastically contracts to some degree. By moving the positioning component 32 in this manner, even in a case in which the length dimensions on the long side of the liquid crystal panel 11 vary for each product, the variations can be absorbed. At this time, the screw through hole 40 is in a state in which it communicates with the screw hole 38.

Next, work is performed to tighten the screw component 37 using a tool such as an electric screwdriver. By screwing the screw component 37 into the screw hole 38 via the screw through hole 40, as shown in FIG. 9, the positioning component 32 is fixed in a mounted state with respect to the frame 14. In this connection, at the time of tightening a force acts via the screw component 37 to rotate the positioning component 32 in the tightening direction (counterclockwise rotation direction as shown in FIG. 9). Since the positioning hole portion 41 preferably has a shape that is elongated from side to side for positioning the positioning component 32, there might be a concern that the positioning component 32 will rotate and become displaced accompanying the action of the aforementioned tightening force.

If a case is supposed in which a positioning protrusion is of a cross-sectional substantially circular shape, since the surfaces on the short side of the positioning hole portion will rotate until they contact against the positioning protrusion, the range of the rotational angle will become quite large. However, according to the present preferred embodiment, since a configuration is adopted in which the positioning protrusion 39 is provided with the bracket surfaces 42 that are substantially parallel with the direction of movement of the positioning component 32, i.e., the direction in which the support surface 36 of the positioning component 32 approaches or moves away from the liquid crystal panel 11, the bracket surfaces 42 contact against the opposing surfaces 41a of the positioning hole portion 41 before the surfaces 41b on the short side, and thus the rotational movement is controlled. This rotational movement is caused by a very small clearance in the vertical direction between the positioning protrusion 39 and the positioning hole portion 41 that is maintained to allow insertion, and the angular range thereof is minimal.

More specifically, when rotating the positioning component 32, the surfaces 41a opposing the positioning protrusion 39 of the positioning hole portion 41 change position in an arc in the counterclockwise rotation direction as shown in FIG. 9 around the axial core position of the screw component 37, and contact against the bracket surfaces 42 of the positioning protrusion 39 in a position that is inclined with respect to the lateral direction. The left side end portion of the bracket surface 42 on the upper side of the positioning protrusion 39 as shown in FIG. 9, and the right side end portion of the bracket surface 42 on the lower side, contact against the respective opposing surfaces 41a of the positioning hole portion 41 that are inclined. In this connection, the long-dashed double short-dashed line shown in FIG. 9 represents the state before rotation.

Although the positioning component 32 rotates by a very small amount owing to the aforementioned clearance, since a buffer member 35 is provided at the position of direct contact with the liquid crystal panel 11, the positioning component 32 is held in a state in which it is in surface contact with the opposing surface 11b of the liquid crystal panel 11 by the buffer member 35 elastically contracting.

Figure 3:
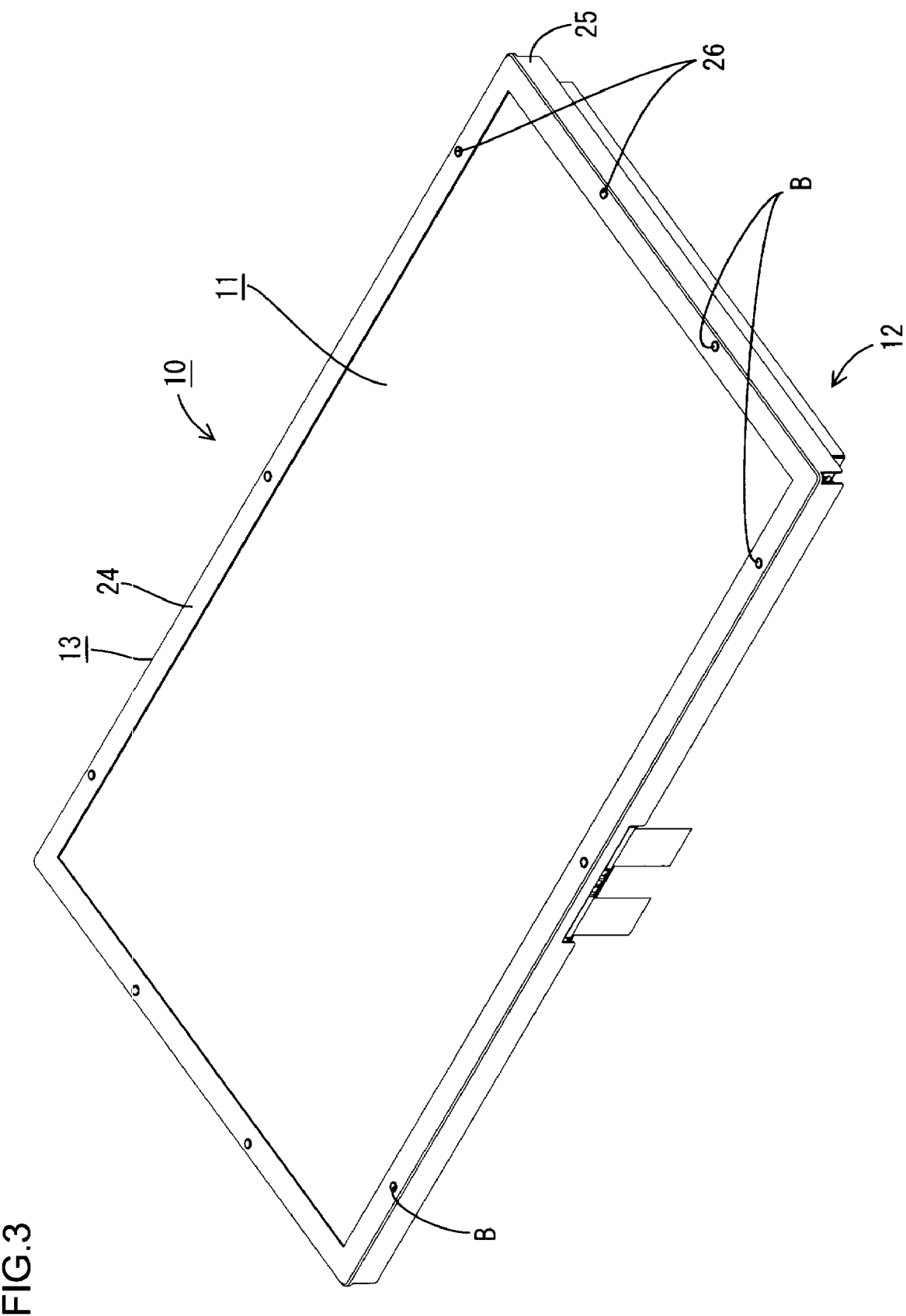
FIG. 3 is an oblique perspective view of the liquid crystal display device.
Figure 4:
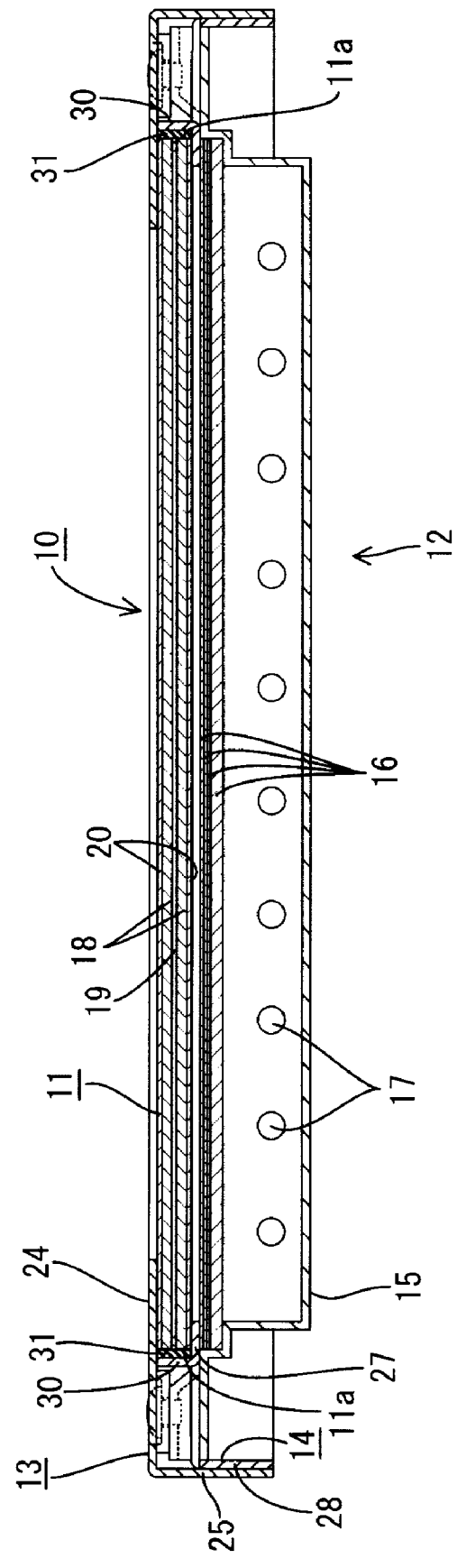
FIG. 4 is a sectional view of the liquid crystal display device.

By attaching two positioning components 32 to the frame 14 in this manner, as shown in FIG. 10, the liquid crystal panel 11 is supported in a positioned state from four sides by the positioning portions 30 and the positioning components 32. Thereafter, by mounting the bezel 13 from the front surface side of the liquid crystal panel 11 and tightening the screws B, as shown in FIG. 3 and FIG. 4, the liquid crystal panel 11 can be held in a state in which it is sandwiched between the frame 14 and the bezel 13.

According to the present preferred embodiment as described above, since bracket surfaces 42 that are substantially parallel with a direction in which the support surface 36 of the positioning component 32 approaches or moves away from the liquid crystal panel 11 are formed in the positioning protrusion 39, an angular range in which the positioning component 32 rotates accompanying tightening of the screw component 37 can be minimized to an extremely small range.

Further, since the bracket surfaces 42 are provided in a pair on the positioning protrusion 39, the tightening force of the screw component 37 can be reliably received by the two bracket surfaces 42. Furthermore, since the positioning protrusion 39 and the positioning hole portion 41 are provided as a pair in positions sandwiching the screw components 37, the tightening force of the screw components 37 can be received more reliably.

Furthermore, since the positioning protrusion 39 preferably has a substantially square shape, the manufacture thereof is simple in comparison to a case in which, for example, the positioning protrusion is formed in a trapezoidal shape or the like.

Other Preferred Embodiments

The present invention is not limited to the preferred embodiments described by the foregoing descriptions and drawings. For example, the following preferred embodiments are also included in the technical scope of the present invention, and various modifications other than those described below may be made without departing from the spirit or scope of the inventive concept of the present invention.

The shape of the positioning protrusions may be one in which, for example, the cross-sectional shape is substantially triangular, substantially trapezoidal, or substantially oval, and in essence may be any shape as long as it has a surface that is substantially parallel with a direction in which the support surface of the positioning component approaches or moves away from the liquid crystal panel. Further, to facilitate insertion into the positioning hole portion, the positioning protrusion may have a tapered shape.

It is not always necessary that the shape of the bracket surface be straight along the lateral direction, and as long as the bracket surface is substantially parallel with a direction in which the support surface of the positioning component approaches or moves away from the liquid crystal panel, a structure in which, for example, the bracket surface forms a slight arc shape is also included in the present invention.

A configuration may be adopted in which, opposite to the configuration in the above described preferred embodiment, a positioning protrusion is provided on the positioning component side and a positioning hole portion is provided on the frame side.

Although according to the preferred embodiments described above, a structure is described in which a penetrating hole shape was exemplified as a "positioning recess", a structure in which a "positioning recess" is a non-penetrating hollow shape is included in the present invention. Further, the shape of the positioning hole portion or the screw through hole can be arbitrarily changed.

The number or positions of the positioning protrusions and the positioning hole portions can be arbitrarily changed. The number of bracket surfaces can also be arbitrarily changed.

Although a liquid crystal panel was exemplified as a "sheet-shaped component" according to the above described preferred embodiment, the present invention can also be applied to a structure that positions an optical sheet of a backlight device with respect to a base.

Although a case in which a positioning component supports only one side of a liquid crystal panel was exemplified according to the above described preferred embodiments, a configuration may also be adopted in which positioning components support two or more sides.

Although a liquid crystal display device was exemplified as a "display device" according to the above described preferred embodiments, the present invention is also applicable to display devices other than a liquid crystal display device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A positioning structure for a sheet-shaped component, comprising:
   a bracket component on which a sheet-shaped component is mounted;
   a positioning component attached to the bracket component and arranged to support the sheet-shaped component in a state with respect to a surface direction thereof; and
   a screw component arranged to fix the positioning component to the bracket component by being tightened with respect to the bracket component; wherein
   a positioning protrusion is provided in one of the bracket component and the positioning component, and a positioning recess into which the positioning protrusion can be inserted is provided in the other of the bracket component and the positioning component;
   the positioning recess having a size such that, in a state in which the positioning protrusion is inserted into the positioning recess, the positioning component can be moved in a direction in which a support surface of the positioning component for the sheet-shaped component approaches or moves away from the sheet-shaped component;
   bracket surfaces are arranged in respective pairs on a peripheral surface of the positioning protrusion facing the positioning recess such that the respective pairs of bracket surfaces face each other;
   the bracket surfaces are substantially parallel with the direction in which the support surface of the positioning component approaches or moves away from the sheet-shaped component; and
   the respective pairs of the bracket surfaces are arranged to oppose rotation of the positioning component by contacting facing surfaces of the positioning protrusion in response to a rotational force generated by tightening of the screw component.

2. The positioning structure for a sheet-shaped component according to claim 1, wherein a buffer member is provided on the surface of the positioning component facing an outer peripheral end surface of the sheet-shaped component.

3. The positioning structure for a sheet-shaped component according to claim 1, wherein the positioning protrusion includes a pair of positioning protrusions, and the positioning recess includes a pair of positioning recesses, respectively, at positions on either side of the screw component.

4. The positioning structure for a sheet-shaped component according to claim 1, wherein the positioning protrusion has a substantially square shape.

5. A display device including the positioning structure for a sheet-shaped component according to claim 1.

* * * * *